United States Patent
Schmid et al.

(10) Patent No.: US 9,388,291 B2
(45) Date of Patent: Jul. 12, 2016

(54) THIN ALUMINUM FLAKES

(71) Applicant: BASF SE, Ludwigshafen (DE)

(72) Inventors: Raimund Schmid, Neustadt (DE); Aron Wosylus, Bad Duerkheim (DE); Christof Kujat, Neustadt (DE); Hans Rudolf Merstetter, Chadds Ford, PA (US); Casper Mullertz, Middletown, DE (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/379,336

(22) PCT Filed: Feb. 27, 2013

(86) PCT No.: PCT/EP2013/053957
§ 371 (c)(1),
(2) Date: Aug. 18, 2014

(87) PCT Pub. No.: WO2013/127874
PCT Pub. Date: Sep. 6, 2013

(65) Prior Publication Data
US 2015/0033987 A1 Feb. 5, 2015

Related U.S. Application Data

(60) Provisional application No. 61/605,773, filed on Mar. 2, 2012.

(30) Foreign Application Priority Data

Mar. 2, 2012 (EP) .................................. 12157842

(51) Int. Cl.
C09C 1/64 (2006.01)
C08K 3/08 (2006.01)
C09C 1/00 (2006.01)
B22F 1/00 (2006.01)
B22F 1/02 (2006.01)
B22F 9/00 (2006.01)
B22F 9/04 (2006.01)

(52) U.S. Cl.
CPC ................. *C08K 3/08* (2013.01); *B22F 1/0055* (2013.01); *B22F 1/02* (2013.01); *B22F 9/00* (2013.01); *B22F 9/04* (2013.01); *C09C 1/0078* (2013.01); *C09C 1/64* (2013.01); *C09C 1/642* (2013.01); *C01P 2004/03* (2013.01); *C01P 2004/61* (2013.01); *C01P 2004/62* (2013.01); *C08K 2003/0812* (2013.01)

(58) Field of Classification Search
CPC ..... C01P 2004/20; C01P 2004/64; C08K 3/08; B22F 1/0055
USPC .......................................... 428/403; 106/404
See application file for complete search history.

(56) References Cited

U.S. PATENT DOCUMENTS

| | | |
|---|---|---|
| 5,964,936 A | 10/1999 | Reisser |
| 6,586,098 B1 | 7/2003 | Coulter et al. |
| 2003/0207113 A1 | 11/2003 | Coulter et al. |
| 2004/0244640 A1 | 12/2004 | Vogt et al. |

FOREIGN PATENT DOCUMENTS

| | | |
|---|---|---|
| EP | 0 848 735 B1 | 1/2002 |
| EP | 1 438 360 B1 | 4/2008 |
| EP | 1 084 198 B2 | 6/2008 |
| EP | 1 812 519 B1 | 9/2008 |
| WO | 02/10290 A1 | 2/2002 |
| WO | 2008/095697 A1 | 8/2008 |

OTHER PUBLICATIONS

International Search Report issued May 21, 2013, in PCT/EP2013/053957, filed Feb. 27, 2013.

*Primary Examiner* — Pegah Parvini
(74) *Attorney, Agent, or Firm* — Oblon, McClelland, Maier & Neustadt, L.L.P.

(57) ABSTRACT

Described are thin plane-parallel aluminum flakes illustrated in FIG. 1 having a thickness of up to 200 nm and comprising an inner layer of oxidized aluminium having a thickness of 0.5-30 nm, a process for the manufacture thereof and the use thereof, e.g. in formulations, like paints, electrostatic coatings, printing inks, plastics materials, and cosmetics. Surprisingly, due to the inner layer of oxidized aluminum the aluminum flakes have an improved shear stability as evidenced e.g. by the difference in lightness before and after shear stress.

13 Claims, 3 Drawing Sheets

50nm

50nm

# THIN ALUMINUM FLAKES

Figure 1:
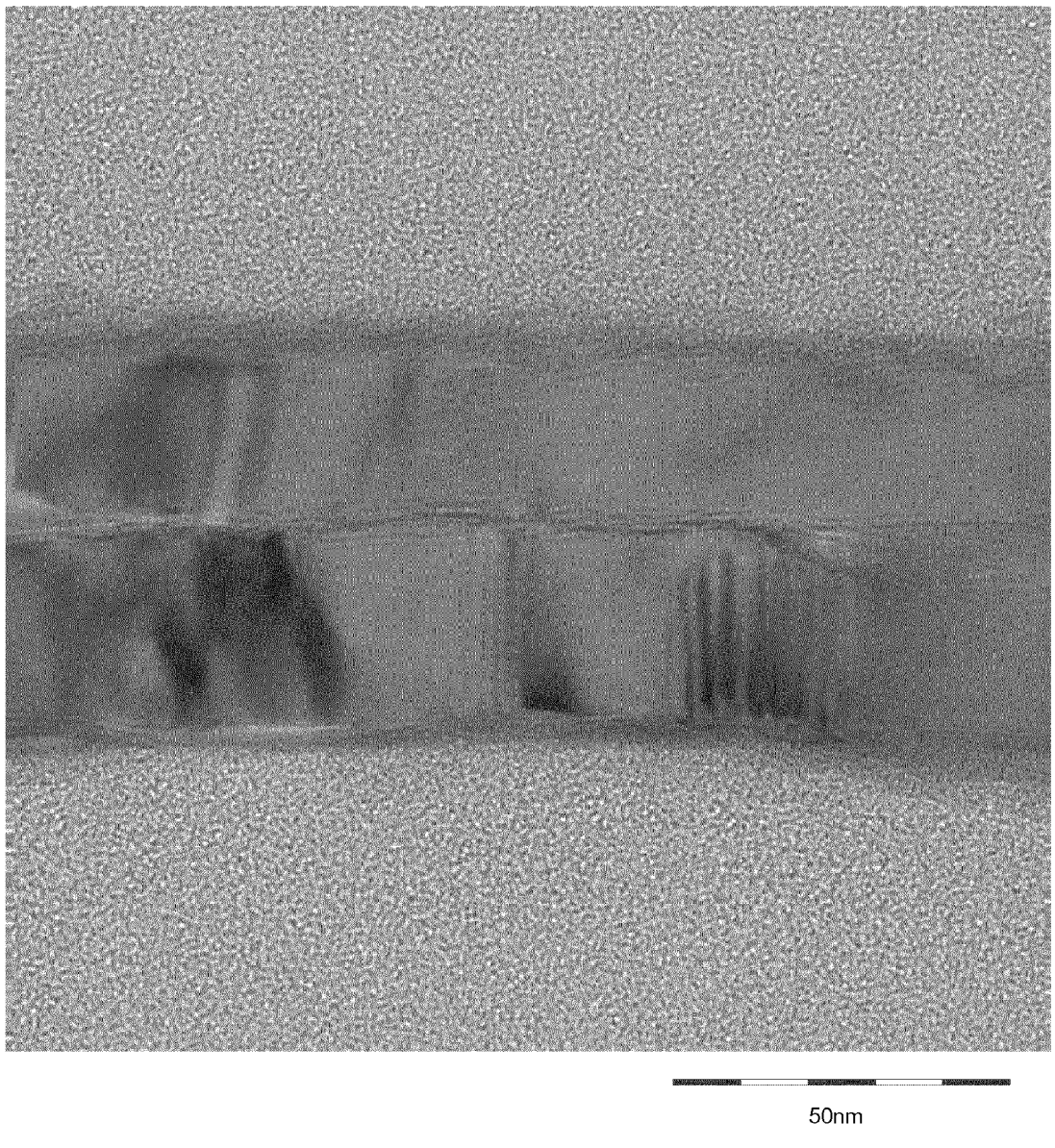

The invention relates to thin, approximately plane-parallel aluminum flakes with improved shear stability comprising an inner layer of oxidized aluminum, to a process for the manufacture thereof and to the use thereof, e.g. in formulations, like paints, electrostatic coatings, printing inks, plastics materials, and cosmetics.

BACKGROUND OF THE INVENTION

Aluminum flakes are the most important group of effect pigments. The unique coloristical and technical profile—high gloss, excellent hiding and neutral silver shade—allow color designers the use in all shade areas.

Conventional metal effect pigments are produced by treating metal granules with stamping machines. The most common way to produce aluminum flakes is the so called Hall process—a wet milling process which is flattening aluminum granules in a ball milling process. Standard aluminum pigments are produced in "cornflake" and "silverdollar" types depending on the quality and shape of the starting granules and on the milling conditions.

The thickness of aluminum flakes produced by mechanical impact is in general in between 50 nm and 1000 nm. The most common types have a medium thickness of 200-500 nm. So called non-degrading flakes have a flake thickness above 500 nm and thus a higher mechanical stability than thinner flakes. However thick flakes like the non-degrading types have a reduced metallic appearance due to undesired scattering at edges and inferior orientation. Thinner flakes have in general a better coloristical appearance (metallic effect). However due to stronger degradation of the thinner flakes under shear stress the coloristical properties of paints comprising the aluminum flakes are changing for example while pumping the paint in a circulation line.

During the last years extremely thin silver dollars with thicknesses <100 nm have been manufactured. Their sensitivity on mechanical impact is even bigger.

A special type of aluminum flakes is PVD (Physical Vapor Deposition) aluminum, also known as VMP (Vacuum Metallized Pigment), produced by a vacuum process where the aluminum is deposited on a web. After releasing the deposited aluminum from the web, very thin plane-parallel flakes are obtained, with improved mirror-like effects when incorporated into coating systems.

The term "plane-parallel flakes" as used herein relates to flakes having two plane faces which are substantially parallel to each other. Said flakes may be in the form of platelets which may be flat or, especially in case of very thin flakes, bent.

In general, commercially available vacuum metallized pigments have thicknesses from 10-50 nm. Those pigments allow mirror like coatings if they are applied on perfectly flat surfaces. However the extremely thin vacuum metallized pigment (VMP) flakes are very sensitive to mechanical impact. That has been for example described in EP1438360B1, column 2, paragraphs [0008] and [0009]. For that reason, the use of VMPs for example in the automotive industry has been mainly restricted to showcars or expensive special editions.

EP0848735 B1 is describing oxidized aluminum or aluminum-alloy pigments having a content of metallic aluminum of not more than 90% by weight with respect to total weight obtainable by oxidation of platelet-shaped aluminum or aluminum-alloy pigments at a pH from 7 to 12 in a mixture of water, one or more water-miscible solvents, and possibly a base, and heating to the boiling point. The resulting pigments have a core of aluminum which is surrounded by a thick layer of oxidized aluminum. Such pigments lack the metallic silver effect and show yellowish to brownish shades. The thick oxidized aluminum layer is stated to improve the mechanical stability (cf. section [0036-0038]).

WO 02/10290 A1 discloses pigment flakes based on an alumina support layer having a thickness of 50 to 1000 nm, preferably 50 to 150 nm, that is coated with a reflector layer preferably composed of a metallic aluminum layer having a thickness of 10 to 150 nm, preferably 80 to 150 nm. The structure of the flakes provides rigidity and brittle fracture during manufacture and application processes.

Hence, there is a demand for effect pigments, preferably with thicknesses <100 nm, more preferably with thicknesses <50 nm, looking like pure silver with the superior metallic effect of thin silver dollars or vacuum metallized pigments and a mechanical stability and/or shear stability which is increased as compared to the prior art. It has surprisingly been found by the inventors of the present patent application that the mechanical stability and/or shear stability of such effect pigments can be improved by an inner core of oxidized aluminum.

SHORT DESCRIPTION OF THE FIGURES

Figure 2:
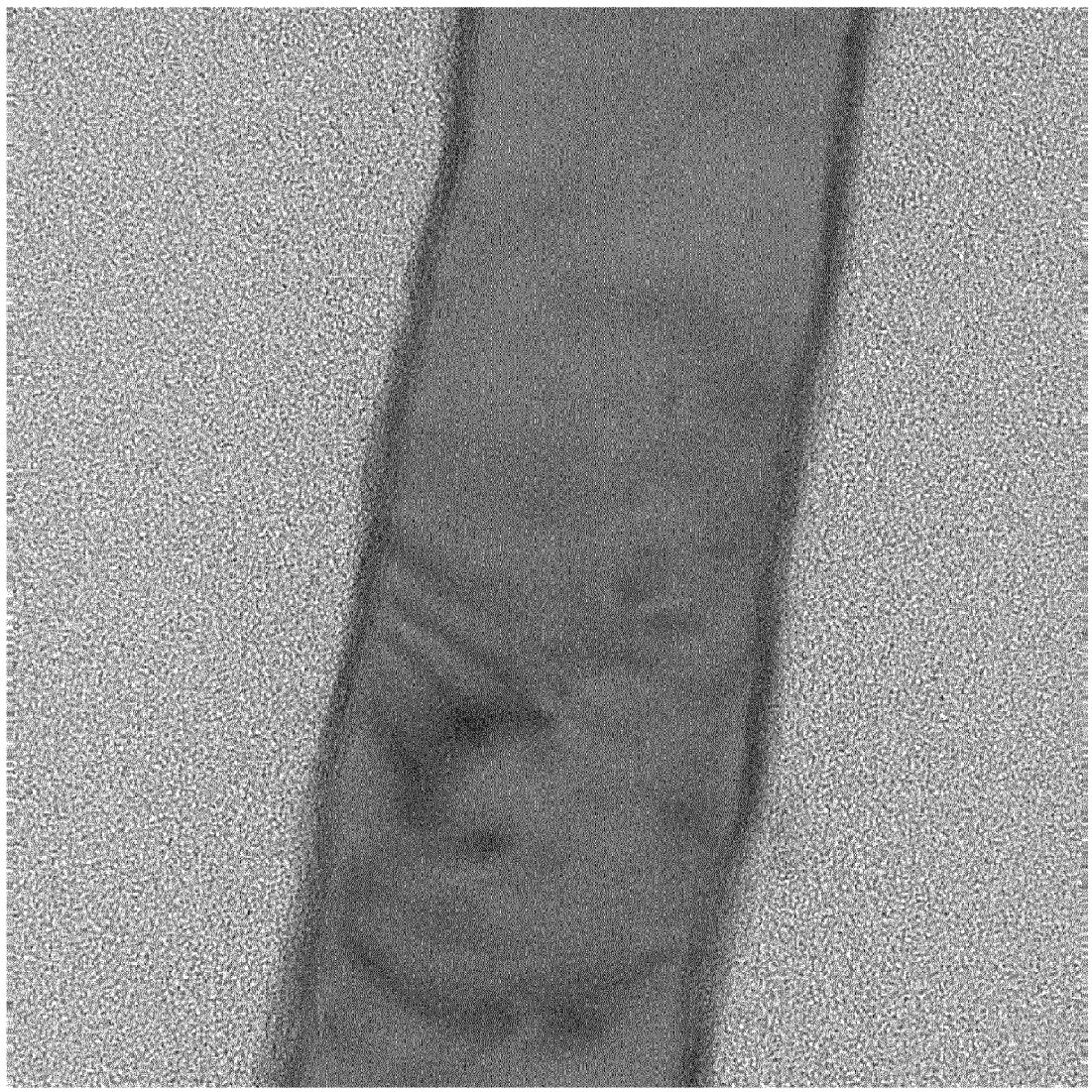
Figure 2:
Figure 3:
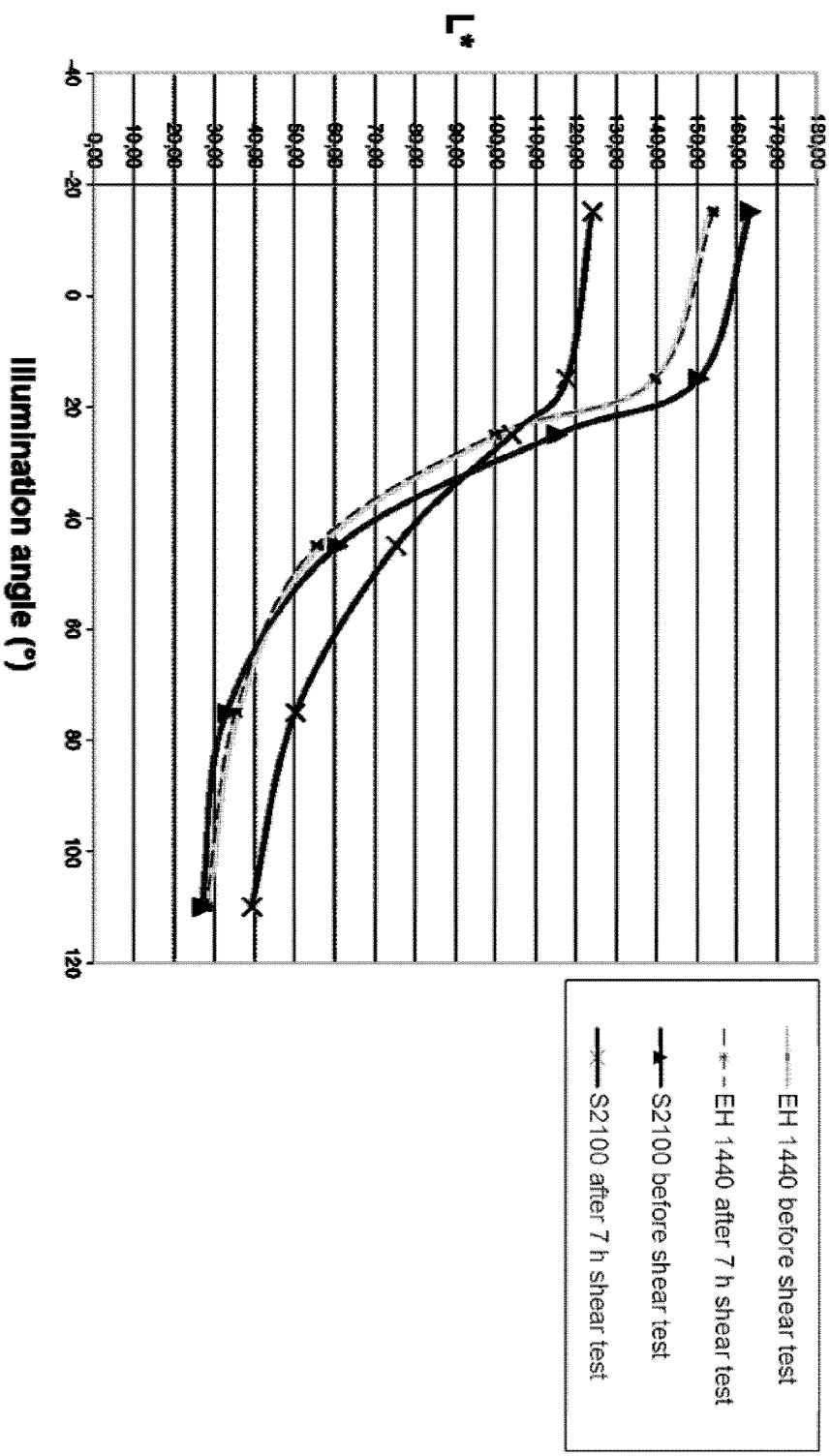

FIG. 1 shows a crosscut through an aluminum flake with an inner and two outermost layers of oxidized aluminum FIG. 2 is a crosscut through an aluminum flake with outermost layers of oxidized aluminum FIG. 3 shows the circulation stability of an aluminum flake (EH 1440) according to the present invention in comparison to a commercially available aluminum flake (Silvershine® S 2100)

The structure of the thin Al flakes of FIGS. 1 and 2 has been investigated as follows:

A paint film with 0.5% Al-flakes (by weight) has been sprayed on a transparent foil. After hardening of the binder system the flakes were fixed and oriented parallel to the surface. Via use of microtome cuts thin slices of the flakes were generated and first flotated onto a water surface. The thin slices were then investigated via transmission electron microscopy (TEM) and Energy Dispersive X-Ray Spectroscopy (EDXS).

SUMMARY OF THE INVENTION

The present invention relates to thin plane-parallel aluminum flakes (useful as an effect pigment) having a thickness of up to 200 nm, comprising an inner layer (core layer) of oxidized aluminum (cf. FIG. 1). Said flakes have a pure silver color and an improved shear stability as compared to aluminum flakes of similar thickness lacking said inner layer.

The term "comprising" as used throughout the present text in connection with a specific feature means that this feature is present, but does not exclude the presence of other feature, i.e. the term "comprising" as used throughout the present text is open-ended. For example, as stated in the preceding paragraph, the aluminum flakes of the present invention comprise an inner layer (core layer) of oxidized aluminum. This wording does neither exclude the presence of additional inner layers (core layers) of oxidized aluminum nor the presence of outer layers of oxidized aluminum, nor the presence of additional layers which have been subjected to surface treatments, etc.

Preferably the thickness of one of said aluminum flakes is <100 nm, more preferably <50 nm as measured by transmission electron microscopy (TEM).

The diameter of said aluminum flakes is about 5-50 µm.

The inner layer of oxidized aluminum has a thickness of 0.5-50, preferably 0.5-30 nm, more preferably 2-30 nm, most preferably 3-10 nm as measured by transmission electron microscopy (TEM).

The thickness of each of the aluminum layers is 5-100 nm, preferably 5-50 nm and most preferably 5-40 nm and the two aluminum layers can have the same or different thickness as measured by transmission electron microscopy (TEM).

An aluminum flake according to the present invention additionally comprises two thin outer layers of oxidized aluminium and may have been subjected to an additional surface treatment, e.g. selected from chromate treatment, phosphate treatment with phosphoric acids or esters thereof, polymer encapsulations with acrylates, silica treatment, and the application of silane layers containing one or more partly hydrolized and condensed silanes. The functional groups of the partly hydrolyzed and condensed silanes may be polymerized to polyacrylates, polyurethanes, polyethers or other known polymers. Typically such "polymerized silanes" are applied in combination with silica treatments—either silica treatment first and silane treatment second or silica treatment and silane treatment simultaneously.

Such surface treatments have been described in numerous publications and patents. An overview is given at Peter WiBling, Metalleffekt-Pigmente, ISBN 3-87870-747-9, page 92-110 and the patents listed on page 110. Further possible surface treatments are described in EP 1084198 B2, WO2008095697 and EP 1812519 and the literature cited therein.

The additional surface treatment on the outermost interfaces is effected in order to optimize application properties like humidity resistance, adhesion and storage stability.

The invention also relates to a process for manufacture of such pigments, and the uses of such pigments like coloration of polymers in paints, coatings, printing inks, plastics, cosmetic applications etc

DETAILED DESCRIPTION OF THE INVENTION

The inner layer zone (the core layer) of the new silver pigment, i.e. the plane-parallel aluminum flake according to the present invention, consists of oxidized aluminum and has a thickness of about 0.5-50, preferably 0.5-30 nm, more preferably 2-30 nm, most preferably 3-10 nm (cf. FIG. 1).

The core layer of oxidized aluminum is surrounded by aluminum layers. There may be a gradient of oxygen decreasing from higher concentration of oxygen in the center of the core to lower concentration towards the adjacent aluminum layers.

Preferably the thickness of each of the aluminum layers is 5-100 nm. A preferred range is 5-50 nm and most preferred are 5-40 nm. The two aluminum layers can have the same thickness (=symmetrical structure) or different thickness (=non symmetrical structure).

Preferably the new silver pigment is consisting of one inner layer (core layer) of oxidized aluminum and two adjacent metallic aluminum layers and two outermost oxidized aluminum layers. The thickness of an outermost oxide layer is about half that of the inner oxide layer, i.e. about 0.25 to 25 nm, preferably 1 to 15 nm, more preferably 1 to 10 nm, most preferably 1.5 to 5 nm. Also claimed and technically possible are silver pigments with two or more inner layers of oxidized aluminum. For economical reasons a low number of inner layers, e.g. 2 inner layers, is preferred.

The diameter of the flakes ranges from 5-50 μm. Most preferred medium particle sizes are between 8 and 20 μm. Flakes with medium diameters of about 20 μm have a slightly higher sparkle effect compared to flakes with medium diameters of about 10 μm.

Also within the scope of the invention is a pigment based on the above described aluminum flakes with inner core(s) of oxidized aluminum, outermost layers of oxidized aluminum and an additional surface treatment on the outermost layers.

Most common surface treatments are chromate treatments, phosphate treatments with phosphoric acids or esters thereof, polymer encapsulations (acrlyates), or silica treatments followed by silane modifications or incorporations whereby functional groups (amines, acrylates, epoxy, isocyanates etc.) of incorporated, partly hydrolyzed silanes polymerize with themselves or with additional organic molecules with functional groups (amines, isocyanates, polyols, accrylates).

The aluminum flakes with an inner core layer of oxidized aluminum (cf. FIG. 1) have the coloristical appearance of vacuum metallized pigments and a higher shear stability than silver dollars with an even higher flake thickness (e.g. Silvershine® S2100; Eckart GmbH, Germany; representing the state of the art of thinnest silver dollars). The inner core of oxidized aluminum reinforces the aluminum flakes without having an impact on coloristics. That means the aluminum flakes of the present invention show pure silver shades without any grey or yellow-brownish appearance of (much) thicker, mechanically and chemically stabilizing outermost aluminum oxide layers of known pigments, like Aloxal® (Eckart).

SYNTHESIS

The process for the manufacture of aluminum flakes according to the present invention comprises a) coating a polyester film with an acrylate based release layer, b) metallizing the precoated polyester film with an aluminum layer in a vacuum via physical vapor deposition, c) removing the vacuum, d) oxidizing the aluminium surface by contact with air, e) metallizing the oxidized aluminum surface with another aluminum layer in a vacuum via physical vapor deposition, f) dissolving the release layer, g) sizing down the obtained coarse aluminum flakes to the desired size, h) removing the dissolved polyacrylate stemming from the release layer, and i) separating the aluminum flakes.

First a polyester film is coated with an acrylate based release layer. This may be carried out e.g. by applying a solution, e.g. a 8% to 15%, especially a 9.5% by weight solution, of a suitable high molecular weight polymer, preferably a methacrylate polymer, in a suitable solvent, preferably ethylacetate, to the polyester film and evaporating the solvent. The high molecular weight polymer has preferably a molecular weight of 200000 to 340000 dalton, preferably about 290000 dalton.

In the next step the precoated polyester film is vacuum metallized with an aluminum layer via physical vapor deposition in a manner well known in the art.

During the next step the vacuum is removed and in contact with air an oxidation of the surface takes place. After the oxidation step another vacuum metallization step is carried out under the same or different conditions.

For economical reasons the steps a) to e) can be carried out several times before starting with step f). In other words, the steps a) to e) described above can be repeated after having first applied again another release layer, i.e. another polyester film coated with an acrylate.

The steps described above can also be made on both sides of the polyester foil.

After having finished the vacuum metallization the release layer(s) are dissolved by moving the metallized foil through a stripping tank filled with a solvent in order to solve the acrylate based release layer. Then the coarse flakes are sized down mechanically (heavy stirring with a blade, e.g. Ultraturrax) and/or by use of ultrasound. Sizing down is stopped once the desired particle size distribution has been adjusted.

In order to wash out the solved polyacrylate one or more washing steps are carried out (adding solvent followed by stirring and separation of the flakes).

During sizing down, passivating agents like esters of phosphoric acids or other surface modifying agents can already be added. This is because during sizing down the pigments are "cut" whereby fresh surfaces are created at the edges which may be or have to be passivated.

Alternatively, the surface modifcation can also be done in a separate process step. If a chrome treatment is the preferred passivation, the aluminum flakes are treated with chromic acid.

In the case of silica/silane treatments the flakes are suspended in an organic medium. Then silanes, small amounts of water and bases are added in order to hydrolyze the silane precursors and form a thin silica/silane layer.

The aluminum flakes with inner layer (core layer) of oxidized aluminum have the typical mirror-like appearance of vacuum metallized pigments. The advantage of the aluminum flakes of the present invention is that their mechanical stability (shear stability) is much higher than that of comparable aluminum flakes (aluminum based effect pigments) described in the state of the art.

The shear stability of a paint can be tested by using for a short time (10-30 minutes) high speed mixers with a rotating blade or mixers working according to the rotor stator principle (Ultraturrax). More realistic are however test conditions under which aluminum based effect paints are pumped and circulated several hours by use of a piston pump.

For better comparison, the tested paints are adjusted to similar hiding and similar viscosity. For example, if a very thin flake has to be compared with a much thicker flake, a lower weight related to aluminum content of the very thin flake has to be used. As a rough indication the following example might explain how to compare shear stability: If for example a 50 nm thick flake has to be compared with a 150 nm thick flake of same diameter roughly ⅓ of weight of thin flakes should be used in the paint for same hiding (i.e. in order to achieve the same hiding) like the thick flake. That corresponds roughly to the same number of flakes per volume paint.

The shear stability of a paint can be assessed for example based on the difference in lightness values L* (according to the CIELab system) before and after the shear stress. Paints comprising the aluminum flakes according to the present invention show almost no change in lightness whereas comparable flakes without the inner layer of oxidized aluminum belonging to the state of the art show strong degradation and a loss of lightness (dL) of e.g. more than 30 units in face angle (cf. FIG. 3).

The following Examples illustrate the invention.

Example 1

Synthesis of a 60 nm Thick Aluminum Flake with an Inner Layer (Core Layer) of Oxidized Aluminum and with a Diameter of ~20 μm (EH 1440; cf. FIG. 1)

A 9.5% by weight solution of a high molecular weight (about 200000 to 340000 dalton) methacrylate polymer in ethylacetate is applied on a polyester film carrier, using a commercial gravure printing process. The solvent is evaporated to form a homogeneous high molecular weight) polymer film (release layer) with a weight of 0.1-0.7 g/m$^2$.

The methacrylate coated polyester film (release layer) is then vacuum metallized at 0.02 to 0.0001 mbar with aluminum, producing an aluminum layer of approximately 30 nm thickness.

The 30 nm aluminum layer is then oxidized at the upper side by exposure to air for at least 1 hour. This upper side is then again vacuum metallized under the same conditions, forming a second layer of aluminum of approximately 30 nm thickness.

After the vacuum metallization the coated polyester foil is put into a bath of ethylacetate. The release layer dissolves and coarse aluminum flakes are chipped off. After having adjusted a solid content of approximately 10-15% sizing down by use of fast rotating blades is started. During sizing down a temperature of 50° C. is not exceeded.

Sizing down is stopped once a medium particle size (diameter) of 20 μm is achieved. Several filtration and washing steps are made in order to remove totally the acrylic resin. Finally a solid content of 10% of aluminum in ethyl acetate is adjusted.

Transmission electron micrographs confirm that all flakes are containing the reinforcing inner layer (core layer) of oxidized aluminum. The obtained aluminum flakes (EH 1440) have a total thickness of approximately 60 nm with an inner core of oxidized aluminum of approximately 5-10 nm thickness, two outermost layers of oxidized aluminum of approximately 5 nm thickness, and a medium flake diameter of approximately 20 μm. The outermost layers of oxidized aluminum form automatically.

Even under the mechanical impact of cutting the flakes, the flakes are not getting damaged or split along that oxygen containing core layer.

Example 2

Synthesis of a 60 nm Thick Aluminum Flake with Inner Core of Oxidized Aluminum and with a Diameter of ~13 μm (EH 1461)

The procedure described in Example 1 is repeated except that sizing down is not stopped once a medium particle size (diameter) of 20 μm is achieved, but when a medium particle size of 13 μm is achieved. Several filtration and washing steps are made in order to remove totally the acrylic resin. Finally a solid content of 10% of aluminum in ethylacetate is adjusted.

Example 3

Circulation Stability of an Aluminum Flake (EH 1440) According to the Present Invention in Comparison to a Commercially Available Aluminum Flake (Silvershine® S 2100; Representing the State of the Art of Thinnest Silver Dollars)

EH 1440, an aluminum flake of approximately 60 nm total thickness with an inner core of oxidized aluminum of approximately 5-10 nm thickness, outermost layers of oxidized aluminum of approximately 5 nm thickness and a medium flake diameter of approximately 20 μm (synthesized as described in Example 1; cf. FIG. 1) is tested for 7 hours in a circulation line driven by a piston pump (Wagner Colora, Italy, Mod. T018000, 8 bar).

As a comparison a thin silver dollar (Silvershine® S 2100; Eckart GmbH, Germany) with an average thickness of approximately 80 nm and a medium diameter of approximately 20 μm is used (cf. FIG. 2).

Both test formulations are adjusted to be hiding at 15-20 μm of dry film thickness. For that reason the paint based on Silvershine was adjusted to 2% aluminum content. Due to thinner flakes and thus better hiding the EH 1440 based paint was made with 0.5% aluminum content.

After 7 hours circulation testing the Silvershine based paint showed strong degradation and a loss of lightness (dL) of more than 30 units in face angle, whereas the EH 1440 based paint showed almost no change in lightness (cf. FIG. 3).

Also at a higher aluminum content of 2%, EH 1440 showed almost no change after 7 hours shear stress.

Based on lightness values L* according to the CIELab system the so called flop-index can be calculated:

$$Fi = 2.68 \times (L^*_{15°} - L^*_{110°})^{1.11} / L^{*0.86}_{45°}$$ Flop-index The flop-index describes the change of the lightness depending on different viewing angles and is determined by the measurement on the change in reflectance of a metallic color as it is rotated through the range of viewing angles. A flop-index of 0 indicates a solid color (i.e. a color which is unicolored, monochromic and/or single-colored), while a very high flop metallic or pearlescent basecoat/clearcoat color may have a flop-index of 15-17.

The following Table 1 shows the flop-index of various samples.

TABLE 1

| Sample | Flop-index |
|---|---|
| EH 1440 (0.5% before shear test) | 15.75 |
| EH 1440 (0.5% after 7 hours shear test) | 15.71 |
| EH 1440 (2% before shear test) | 14.91 |
| EH 1440 (2% after 7 hours shear test) | 14.86 |
| S2100 (0.5% before shear test) | 14.20 |
| S2100 (0.5% after 7 hours shear test) | 13.20 |
| S2100 (2% before shear test) | 16.03 |
| S2100 (2% after 7 hours shear test) | 8.50 |

The flop-index evident from Table 1 clearly indicates high shear stability of EH 1440 in all concentrations as evident from the small change of the flop-index before and after the shear stress and inferior stability of Silvershine S2100 representing the state of the art of thinnest silver dollars as evident from the much bigger change of the flop-index before and after the shear stress.

The invention claimed is:

1. A plane-parallel aluminium flake having a thickness of up to 200 nm comprising an inner layer of oxidized aluminium having a thickness of from 0.5-30 nm, adjacent aluminum layers, and one or more outer layers of oxidized aluminium, each having a thickness of from 0.25-25 nm.

2. The aluminium flake according to claim 1, wherein the thickness of the flake is less than 100 nm, and a diameter of the flake is from 5-50 μm.

3. The aluminium flake according to claim 2, wherein the inner layer of oxidized aluminum has a thickness of from 2-30 nm.

4. The aluminium flake according to claim 2, wherein the thickness of each of the adjacent aluminum layers is from 5-100 nm and wherein the adjacent aluminum layers can have the same or different thickness.

5. The aluminium flake according to claim 1, wherein said aluminium flake has been subjected to an additional surface treatment.

6. The aluminium flake according to claim 1, wherein said aluminium flake has been subjected to an additional surface treatment, said surface treatment is selected from chromate treatment, phosphate treatment with phosphoric acids or esters thereof, polymer encapsulations with acrylates, silica treatment, and the application of silane layers containing one or more silanes or polymerized silanes optionally in combination with silica treatments.

7. A method for the manufacture of aluminium flake according to claim 1, comprising
a) coating a polyester film with an acrylate based release layer,
b) metallizing the precoated polyester film with an aluminum layer in a vacuum via physical vapor deposition,
c) removing the vacuum,
d) oxidizing the aluminium surface by contact with air,
e) metallizing the oxidized aluminum surface with another aluminum layer in a vacuum via physical vapor deposition,
f) dissolving the release layer,
g) sizing down the obtained coarse aluminum flakes to the desired size,
h) removing the dissolved polyacrylate stemming from the release layer, and
i) separating the aluminum flakes.

8. A paint, an electrostatic coating, a printing ink, a plastic material, and a cosmetic comprising the aluminium flake according to claim 1.

9. The aluminium flake according to claim 1, having a thickness of less than 50 nm, and a diameter from 8-20 μm.

10. The aluminium flake according to claim 2, wherein the thickness of each of the adjacent aluminum layers is from 5-40 nm and wherein the adjacent aluminum layers can have the same or different thickness.

11. The aluminium flake according to claim 2, wherein the inner layer of oxidized aluminum has a thickness of from 3-10 nm.

12. The method of claim 7, wherein a), b), c), d), and e) are performed in sequence two or more times before f), g), h) and i).

13. The method of claim 7, wherein said method is performed on both sides of the polyester film.

* * * * *